US010509597B2

(12) United States Patent
Gaewsky et al.

(10) Patent No.: US 10,509,597 B2
(45) Date of Patent: Dec. 17, 2019

(54) MEMORY BLOCK ACCESS MODES FOR A STORAGE DEVICE

(71) Applicant: Intel Corporation, Santa Clara, CA (US)

(72) Inventors: Kristopher H. Gaewsky, El Dorado Hills, CA (US); Jason H. Culp, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 164 days.

(21) Appl. No.: 15/860,602

(22) Filed: Jan. 2, 2018

(65) Prior Publication Data
US 2019/0042154 A1 Feb. 7, 2019

(51) Int. Cl.
G06F 3/06 (2006.01)
G06F 12/02 (2006.01)

(52) U.S. Cl.
CPC .......... *G06F 3/0659* (2013.01); *G06F 3/064* (2013.01); *G06F 3/0604* (2013.01); *G06F 3/068* (2013.01); *G06F 3/0679* (2013.01); *G06F 12/0246* (2013.01)

(58) Field of Classification Search
None
See application file for complete search history.

(56) References Cited

U.S. PATENT DOCUMENTS

| 10,339,983 | B1* | 7/2019 | Confalonieri | ............ G11C 7/04 |
| 2014/0047302 | A1* | 2/2014 | Guo | .................... G06F 11/1068 |
| | | | | 714/773 |
| 2014/0082460 | A1* | 3/2014 | Pangal | ................ G06F 11/2094 |
| | | | | 714/773 |
| 2015/0092488 | A1* | 4/2015 | Wakchaure | .......... G11C 16/349 |
| | | | | 365/185.03 |

* cited by examiner

*Primary Examiner* — Kevin Verbrugge
(74) *Attorney, Agent, or Firm* — Thorpe North & Western, LLP; David W. Osborne

(57) ABSTRACT

Technology for a NAND memory is described. The NAND memory can include a first-type dedicated memory block. The NAND memory can include a second-type dedicated memory block. The NAND memory can include logic to perform a data operation on the first-type dedicated memory block using a first first-type access mode. The NAND memory can include logic to perform a data operation on the variable-type memory block using a second first-type access mode.

20 Claims, 6 Drawing Sheets

MEMORY BLOCK ACCESS MODES FOR A STORAGE DEVICE

BACKGROUND

Memory devices are typically provided as internal, semiconductor, integrated circuits in computers or other electronic devices. There are many different types of memory including volatile memory, for example, dynamic random access memory (DRAM), synchronous dynamic random access memory (SDRAM), and non-volatile memory, for example, flash memory.

Flash memory devices typically use a one-transistor memory cell that allows for high memory densities, high reliability, and low power consumption. Changes in threshold voltage of the cells, through programming of a charge storage node (e.g., a floating gate or charge trap) determine the data state of each cell. Other non-volatile memories such as phase change (PRAM) use other physical phenomena such as a physical material change or polarization to determine the data state of each cell. Common uses for flash and other solid state memories include personal computers, personal digital assistants (PDAs), digital cameras, digital media players, digital recorders, games, appliances, vehicles, wireless devices, cellular telephones, and removable portable memory modules among others.

BRIEF DESCRIPTION OF THE DRAWINGS

Features and advantages of technology embodiments will be apparent from the detailed description which follows, taken in conjunction with the accompanying drawings, which together illustrate, by way of example, various technology features; and, wherein.

Figure 1:
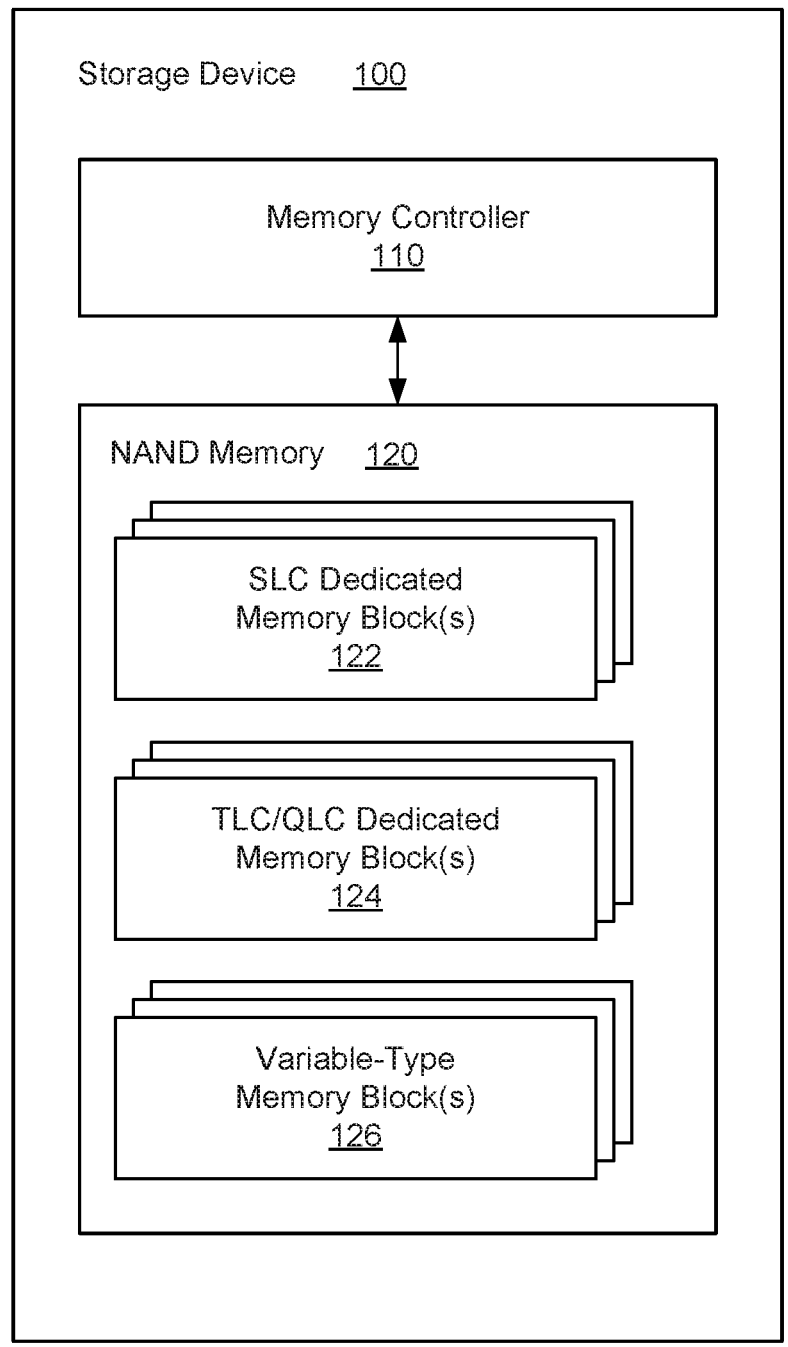
FIG. 1 illustrates a storage device in accordance with an example embodiment.

Reference will now be made to the exemplary embodiments illustrated, and specific language will be used herein to describe the same. It will nevertheless be understood that no limitation on technology scope is thereby intended.

DESCRIPTION OF EMBODIMENTS

Before the disclosed invention embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various invention embodiments. One skilled in the relevant art will recognize, however, that such detailed embodiments do not limit the overall technological concepts articulated herein, but are merely representative thereof.

As used in this written description, the singular forms "a," "an" and "the" include express support for plural referents unless the context clearly dictates otherwise. Thus, for example, reference to "a bit line" includes a plurality of such bit lines.

Reference throughout this specification to "an example" means that a particular feature, structure, or characteristic described in connection with the example is included in at least one embodiment of the present invention. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," "maximized," "minimized," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

A storage device can utilize non-volatile memory. Non-volatile memory is a storage medium that does not require power to maintain the state of data stored by the medium. Non-volatile memory is typically used for the task of secondary storage, or long-term persistent storage. Non-limiting examples of non-volatile memory can include any or a combination of solid state memory (such as planar or three-dimensional (3D) NAND flash memory, NOR flash memory, or the like), cross point array memory, including 3D cross point memory, phase change memory (PCM), such as chalcogenide PCM, non-volatile dual in-line memory module (NVDIMM), byte addressable nonvolatile memory, ferroelectric memory (FeRAM), silicon-oxide-nitride-oxide-silicon (SONOS) memory, polymer memory (e.g., ferroelectric polymer memory), ferroelectric transistor random access memory (Fe-TRAM), spin transfer torque (STT) memory, nanowire memory, electrically erasable programmable read-only memory (EEPROM), magnetic storage memory, magnetoresistive random-access memory (MRAM), write in place non-volatile MRAM (NVMRAM), nanotube RAM (NRAM), and the like. In some examples, non-volatile memory can comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org). In one specific example, the storage device can utilize 3D cross point memory.

In one example, the storage device can include NAND memory with multiple types of memory blocks. For example, the NAND memory can include native triple/quad-level cell (TLC/QLC) dedicated memory blocks (or multi-level cell (MLC) dedicated memory blocks), single-level cell (SLC) on-the-fly (OTF) dedicated blocks and variable memory blocks (or mixed memory blocks). The TLC/QLC dedicated memory blocks can be accessed using a native TLC/QLC access mode. For example, a data operation (e.g., a read, write or erase operation) can be performed on the TLC/QLC dedicated memory blocks using the native TLC/

QLC access mode. The SLC OTF dedicated memory blocks can be accessed using an SLC-OTF access mode. In this example, the SLC-OTF access mode can be provided in a native TLC and QLC NAND memory device.

In one example, the variable memory blocks can be SLC-OTF memory blocks or native TLC/QLC memory blocks on a per cycle basis. In other words, the variable memory blocks can switch back and forth between being SLC-OTF memory blocks or native TLC/QLC memory blocks on a per cycle basis. Thus, when the variable memory blocks are being used as SLC-OTF memory blocks, the variable memory blocks can be accessed using the SLC-OTF access mode. On the other hand, when the variable memory blocks are being used as native TLC/QLC memory blocks, the variable memory blocks can be accessed using the native TLC/QLC access mode. Thus, mixed native/SLC-OTF access mode usage can be supported on the same variable memory blocks from cycle to cycle. At a system level, it is desirable to mix access modes on the same variable memory blocks to improve system performance.

Previously, a same SLC-OTF access mode accessed both the SLC OTF dedicated memory blocks and variable memory blocks being used as SLC-OTF memory blocks. In other words, a single SLC-OTF trim set is used for accessing both SLC OTF dedicated memory blocks and variable memory blocks being used as SLC-OTF memory blocks. Similarly, a same native TLC/QLC access mode was previously used for accessing both the TLC/QLC dedicated memory blocks and variable memory blocks being used as native TLC/QLC memory blocks.

However, utilizing the same SLC-OTF access mode for accessing both the SLC OTF dedicated memory blocks and variable memory blocks being used as SLC-OTF memory blocks degrades a cycling endurance of the native TLC/QLC access mode and a raw bit error rate (RBER), which results in the inability to satisfy cycling targets for native TLC/QLC access modes on variable memory blocks (or mixed memory blocks). In other words, using the same SLC-OTF access mode for multiple types of memory blocks negatively affects the native TLC/QLC access mode being used on the variable memory blocks, in terms of the cycling endurance of the native TLC/QLC access mode and the RBER.

In the present technology, different SLC-OTF access modes can be used for accessing the SLC OTF dedicated memory blocks and variable memory blocks being used as SLC-OTF memory blocks, respectively. For example, a first SLC-OTF access mode (e.g., SLC-OTF user access mode 1) can be used for accessing the SLC OTF dedicated memory blocks, and a second SLC-OTF access mode (e.g., SLC-OTF user access mode 2) can be used for accessing the variable memory blocks being used as SLC-OTF memory blocks. In this case, the second SLC-OTF access mode can be an additional access mode that is specifically created for the variable memory blocks being used as SLC-OTF memory blocks. The second SLC-OTF access mode can have a different trim set (or configuration settings) as compared to the first SLC-OTF access mode. The second SLC-OTF access mode can be created to be dedicated for mixed native/SLC-OTF access mode usage on the same variable memory blocks, thereby preserving the native TLC/QLC cycling endurance and RBER.

In one example, the second SLC-OTF access mode can be selectable via a memory command or via a set feature command. For example, the set feature command to access the second SLC-OTF access mode can be provided in an external NAND datasheet.

In contrast, past NAND components would include native TLC/QLC access and only one SLC-OTF access mode by default. Mixed access mode memory block selection would be performed with the single SLC-OTF access mode (SLC-OTF user access mode 1) by default, which results in downsides in terms of the cycling endurance and RBER. Therefore, the present technology provides an additional SLC-OTF access mode (SLC-OTF user access mode 2) that is dedicated for mixed access mode memory block selection, thereby mitigating the downsides in terms of cycling endurance and RBER which resulted from using only the single SLC-OTF access mode in the past.

FIG. 1 illustrates an exemplary storage device 100. The storage device 100 can include a memory controller 110 and a NAND memory 120. The NAND memory 120 can include SLC dedicated memory blocks 122, TLC/QLC dedicated memory blocks 124, and variable-type memory blocks 126. In one example, the SLC dedicated memory blocks 122 can be accessed using an SLC-OTF access mode. For example, a data operation (e.g., a read, write or erase operation) can be performed on the SLC dedicated memory blocks 122 using the SLC-OTF access mode. In another example, the TLC/QLC dedicated memory blocks 124 can be accessed using a native TLC/QLC access mode. For example, a data operation (e.g., a read, write or erase operation) can be performed on the TLC/QLC dedicated memory blocks 124 using the native TLC/QLC access mode.

In one example, the variable-type memory blocks 126 (or mixed mode memory blocks) can be SLC-OTF memory blocks or native TLC/QLC memory blocks on a per cycle basis. In other words, the variable-type memory blocks 126 can switch back and forth between being SLC-OTF memory blocks or native TLC/QLC memory blocks on a per cycle basis. Thus, when the variable-type memory blocks 126 are being used as SLC-OTF memory blocks, the variable-type memory blocks 126 can be accessed using the SLC-OTF access mode. On the other hand, when the variable-type memory blocks 126 are being used as native TLC/QLC memory blocks, the variable-type memory blocks 126 can be accessed using the native TLC/QLC access mode. Thus, mixed native/SLC-OTF access mode usage can be supported on the same variable-type memory blocks 126 from cycle to cycle.

In one configuration, the NAND memory 120 can perform a data operation on the SLC dedicated memory block 122 using a first SLC-OTF access mode (e.g., SLC-OTF user access mode 1), and the NAND memory 120 can perform a data operation on the variable-type memory block 126 using a second SLC-OTF access mode (e.g., SLC-OTF user access mode 2) when the variable-type memory block 126 is being used as an SLC-OTF memory block during a particular cycle. The first SLC-OTF access mode can be associated with a first trim set and the second SLC-OTF access mode can be associated with a second trim set that is different than the first trim set. In addition, the second SLC-OTF access mode can preserve a cycling endurance and a RBER for the variable-type memory block 126.

In one example, the second trim set associated with the second SLC-OTF access mode can define a modified threshold voltage (Vt) placement window (as compared to the first trim set associated with the first SLC-OTF access mode), in which erase and program operations are performed according to a different (e.g., lower) Vt to shift the cycling endurance and RBER curve. In other words, the second trim set associated with the second SLC-OTF access mode can be different than the first trim set associated with the first SLC-OTF access mode in terms of the Vt placement window, which can preserve the cycling endurance and RBER for the second SLC-OTF access mode.

Previously, the NAND memory 120 performed data operations on the SLC dedicated memory block 122 using an SLC-OTF access mode, and the NAND memory 120 would perform data operations on the variable-type memory block 126 being used as an SLC-OTF memory block using the same SLC-OTF access mode.

However, in the present technology, the NAND memory 120 performs data operations on the SLC dedicated memory block 122 using a first SLC-OTF access mode, and the NAND memory 120 performs data operations on the variable-type memory block 126 being used as an SLC-OTF memory block using a second SLC-OTF access mode. In this case, the first SLC-OTF access mode can use an internal NAND trim set (or configuration setting) that is different than that used by the second SLC-OTF access mode. In other words, in the present technology, the internal NAND trim sets can be set independently for these two different use cases, which can preserve native TLC/QLC cycling endurance and RBER in both mixed mode memory block selection and native modes. In one example, the NAND memory 120 can include updated firmware that supports both the first SLC-OTF access mode and the second SLC-OTF access mode. In this example, the SLC-OTF user access mode 1 can be preserved to maintain the higher cycling endurance on dedicated SLC-OTF memory block selection, while the SLC-OTF user access mode 2 can be created for mixed native/SLC-OTF access mode usage.

In one example, the present technology can enable system level mixed mode memory block selection between the native TLC/QLC access mode and a new SLC-OTF access mode (i.e., the second SLC-OTF access mode, or SLC-OTF user access mode 2), without comprising the native TLC/QLC cycling endurance or RBER versus standard dedicated memory block usage. The addition of the new SLC-OTF access mode can provide a system level performance improvement due to the new mixed mode memory block selection capability. The new SLC-OTF access mode can specifically be used for mixing cycles on the same variable-type memory blocks 126. In contrast to the SLC dedicated memory blocks 122 and the TLC/QLC dedicated memory blocks 124, the variable-type memory blocks 126 have the ability to go back and forth between SLC and TLC/QLC (e.g., every other cycle), and the mixing between SLC and TLC/QLC has caused endurance problems when using the same SLC-OTF access mode. Therefore, the new SLC-OTF access mode with a different trim set can improve the switching between the SLC and TLC/QLC in the variable-type memory blocks 126.

In one example, the NAND memory 120 can perform a data operation on the TLC/QLC dedicated memory block 124 using a native TLC/QLC access mode, and the NAND memory 120 can perform a data operation on the variable-type memory block 126 using the native TLC/QLC access mode when the variable-type memory block 126 is being used as a native TLC/QLC memory block during a particular cycle.

In one example, the second SLC-OTF access mode can be selectable via a memory command or via a set feature command. For example, the set feature command to access the second SLC-OTF access mode can be provided in an external NAND datasheet for the NAND memory 120. Similarly, the first SLC-OTF access mode can be selectable via a memory command or via a set feature command, which is different than the memory command and the set feature command associated with the second SLC-OTF access mode (SLC-OTF user access mode 2). In one example, the NAND datasheet can include a command sequence and/or a set feature sequence to enable the first SLC-OTF access mode and the second SLC-OTF access mode. The command sequence can be used for entering/exiting the first SLC-OTF access mode and the second SLC-OTF access mode. The set feature sequence can include a different string of commands to access the first SLC-OTF access mode and the second SLC-OTF access mode. In another example, a sequence can be used to specify that certain memory blocks in the NAND device 120 are to be used with the first SLC-OTF access mode and that other memory blocks in the NAND device 120 are to be used with the second SLC-OTF access mode.

In one configuration, the memory controller 110 in the storage device 100 can initiate data operations to be performed on the NAND memory 120. For example, the memory controller 110 can send a command to the NAND memory 120 to perform a data operation on the SLC dedicated memory block 122 using the first SLC-OTF access mode. As another example, the memory controller 110 can send a command to the NAND memory 120 to perform a data operation on the variable-type memory block 126 using the second SLC-OTF access mode. As yet another example, the memory controller 110 can send a command to the NAND memory 120 to perform a data operation on the TLC/QLC dedicated memory block 124 using the native TLC/QLC access mode. As a further example, the memory controller 110 can send a command to the NAND memory 120 to perform a data operation on the variable-type memory block 126 using the native TLC/QLC access mode. Thus, the NAND memory 120 can perform a particular data operation based on a respective command received from the memory controller 110.

In one example, the NAND memory 120 can initialize defined SLC dedicated memory blocks 122 in the NAND memory 120 to be accessible via the first SLC-OTF access mode. In addition, the NAND memory 120 can initialize defined variable-type memory blocks 126 in the NAND memory 120 to be accessible via the second SLC-OTF access mode.

As an example, the NAND memory 120 can initialize memory blocks 0-19 to be accessible via the first SLC-OTF access mode, and the NAND memory 120 can initialize memory blocks 20-100 to be accessible via the second SLC-OTF access mode. For example, the NAND memory 120 can initialize the memory blocks based on instructions received from a user of the storage device 100. In this example, the NAND memory 120 can perform an initialization process a single time, and after that point, memory blocks 0-19 are configured to be accessible via the first SLC-OTF access mode and the memory blocks 20-100 are configured to be accessible via the second SLC-OTF access mode. In an alternative example, a specific SLC-OTF access mode (e.g., SLC-OTF user access mode 1 or SLC-OTF user access mode 2) can be performed on a per data operation basis. For example, for a first data operation (e.g., an erase-program-read operation), SLC-OTF user access mode 1 can be selected, and for a second data operation, a native TLC/QLC access mode can be selected, and for a third data operation, SLC-OTF user access mode 2 can be selected, and so on.

In one example, the NAND memory 120 can support an SLC-OTF access mode for the SLC dedicated memory blocks 122, and the NAND memory 120 can support a native TLC/QLC access mode for the TLC/QLC dedicated memory blocks 124, where the SLC-OTF access mode can provide a faster read and write performance as compared to the native TLC/QLC access mode. In other words, the SLC-OTF access mode can provide a faster programming time (tprog) as compared to the native TLC/QLC access mode. However, since the SLC dedicated memory blocks 122 only support one bit per cell, while the TLC/QLC dedicated memory blocks 124 can support 3 or 4 bits per cell, respectively, the TLC/QLC dedicated memory blocks 124 can store an increased amount of data as compared to the SLC dedicated memory blocks 122.

Figure 2:
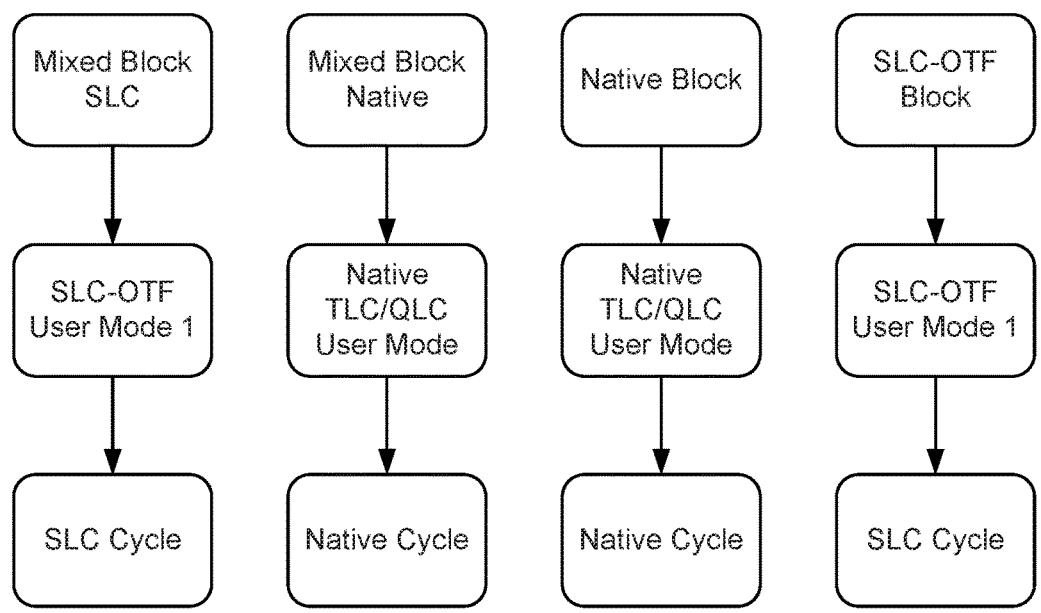
FIG. 2 illustrates memory block access modes in accordance with an example embodiment.

FIG. 2 illustrates an example of memory block access modes. For a mixed memory block with SLC (e.g., a variable-type memory block being used as an SLC-OTF memory block), an SLC-OTF user mode 1 can be used during an SLC cycle. For a mixed memory block with native TLC/QLC (e.g., a variable-type memory block being used as a native TLC/QLC memory block), a native TLC/QLC user mode can be used during a native cycle. For a native TLC/QLC memory block (e.g., a TLC/QLC dedicated memory block), the native TLC/QLC user mode can be used during a native cycle. For an SLC-OTF memory block (e.g., an SLC dedicated memory block), an SLC-OTF user mode 1 can be used during an SLC cycle. In this example, the same SLC-OTF user mode 1 can be used for the mixed memory block with SLC (e.g., a variable-type memory block being used as an SLC-OTF memory block), as well as the SLC-OTF memory block (e.g., an SLC dedicated memory block).

Figure 3:
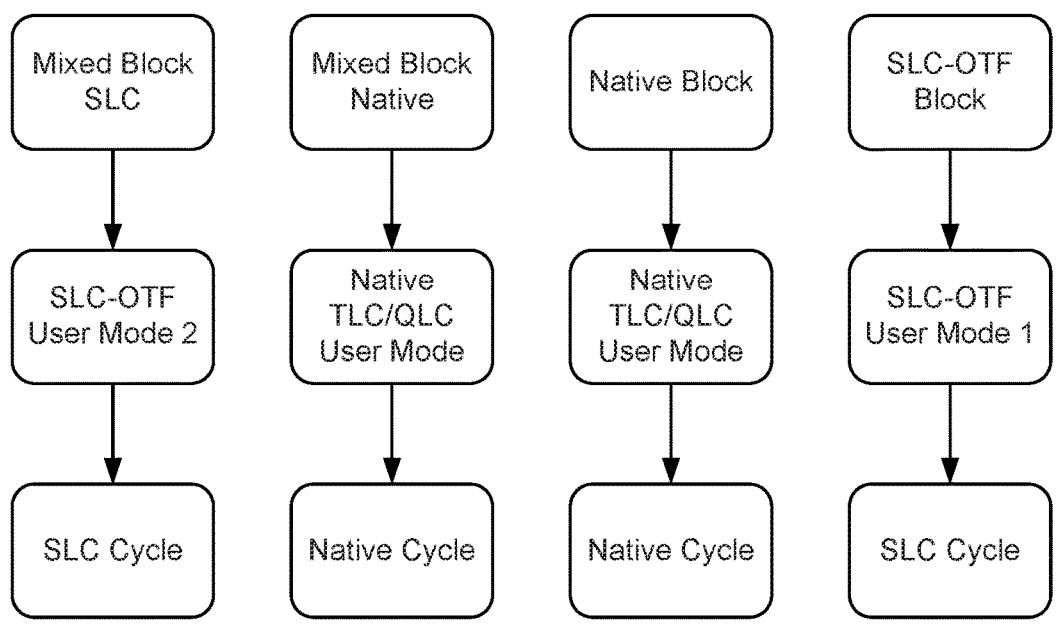
FIG. 3 further illustrates memory block access modes in accordance with an example embodiment.

FIG. 3 illustrates an example of memory block access modes. For a mixed memory block with SLC (e.g., a variable-type memory block being used as an SLC-OTF memory block), an SLC-OTF user mode 2 can be used during an SLC cycle. For a mixed memory block with native TLC/QLC (e.g., a variable-type memory block being used as a native TLC/QLC memory block), a native TLC/QLC user mode can be used during a native cycle. For a native TLC/QLC memory block (e.g., a TLC/QLC dedicated memory block), the native TLC/QLC user mode can be used during a native cycle. For an SLC-OTF memory block (e.g., an SLC dedicated memory block), an SLC-OTF user mode 1 can be used during an SLC cycle. In this example, different SLC-OTF user modes (e.g., SLC-OTF user mode 2 versus SLC-OTF user mode 1) can be used for the mixed memory block with SLC (e.g., a variable-type memory block being used as an SLC-OTF memory block), and the SLC-OTF memory block (e.g., an SLC dedicated memory block), respectively.

Figure 4:
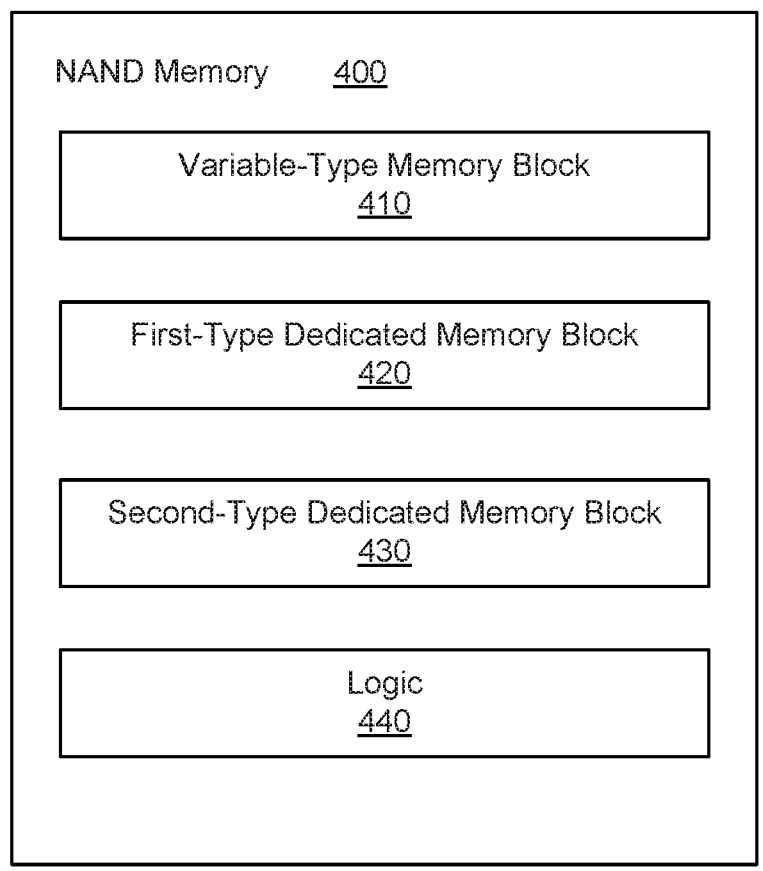
FIG. 4 illustrates a NAND memory in accordance with an example embodiment.

FIG. 4 illustrates a system 400 a NAND memory 400. The NAND memory 400 can include a variable-type memory block 410. The NAND memory 400 can include a first-type dedicated memory block 420. The NAND memory 400 can include a second-type dedicated memory block 430. The NAND memory 400 can include logic 440 to perform a data operation on the first-type dedicated memory block 420 using a first first-type access mode. The NAND memory 400 can include logic 440 to perform a data operation on the variable-type memory block 410 using a second first-type access mode. The data operation can include one of: a read operation, a write operation or an erase operation.

In one example, the first first-type access mode can be a first single-level cell (SLC) on-the-fly (OTF) user access mode and the second first-type access mode can be a second SLC OTF user access mode. In other words a first-type access mode can refer to an SLC OTF user access mode. The first first-type access mode can be associated with a first trim set, and the second first-type access mode can be associated with a second trim set that is different than the first trim set.

In one example, the variable-type memory block 410 can be an SLC memory block or a triple/quad-level cell (TLC/QLC) memory block on a per cycle basis. The first-type dedicated memory block 420 can be an SLC dedicated memory block. The second-type dedicated memory block 430 can be a TLC/QLC dedicated memory block.

In one example, the second first-type access mode can preserve a cycling endurance and a raw bit error rate (RBER) for the variable-type memory block 410. The second first-type access mode can be selectable via a memory command or a set feature command.

In one example, the logic 440 can perform a data operation on the second-type dedicated memory block 430 using a second-type access mode, wherein the second-type access mode is a TLC/QLC user access mode. In other words, the first-type access mode can refer to an SLC OTF user access mode and the second-type access mode can refer to a TLC/QLC user access mode. In another example, the logic 440 can perform a data operation on the variable-type memory block 410 using a second-type access mode, wherein the second-type access mode is a TLC/QLC user access mode.

In one example, the logic 440 can initialize defined variable-type memory blocks 410 in the NAND memory 400 to be accessible via the second first-type access mode. In addition, the logic 440 can initialize defined first-type dedicated memory blocks 420 in the NAND memory 440 to be accessible via the first first-type access mode.

Figure 5:
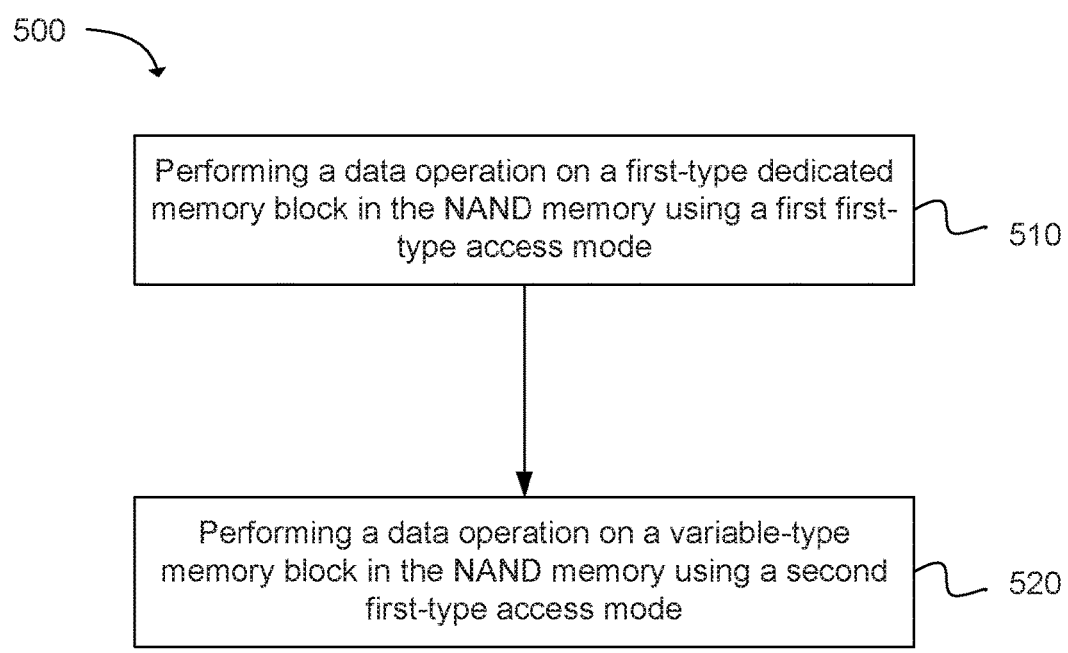
FIG. 5 is a flowchart illustrating operations for performing data operations on a NAND memory in accordance with an example embodiment.

Another example provides a method 500 for performing data operations on a NAND memory, as shown in the flow chart in FIG. 5. The method can be executed as instructions on a machine, where the instructions are included on at least one computer readable medium or one non-transitory machine readable storage medium. The method can include the operation of: performing a data operation on a first-type dedicated memory block in the NAND memory using a first first-type access mode, as in block 510. The method can include the operation of: performing a data operation on a variable-type memory block in the NAND memory using a second first-type access mode, as in block 520.

Figure 6:
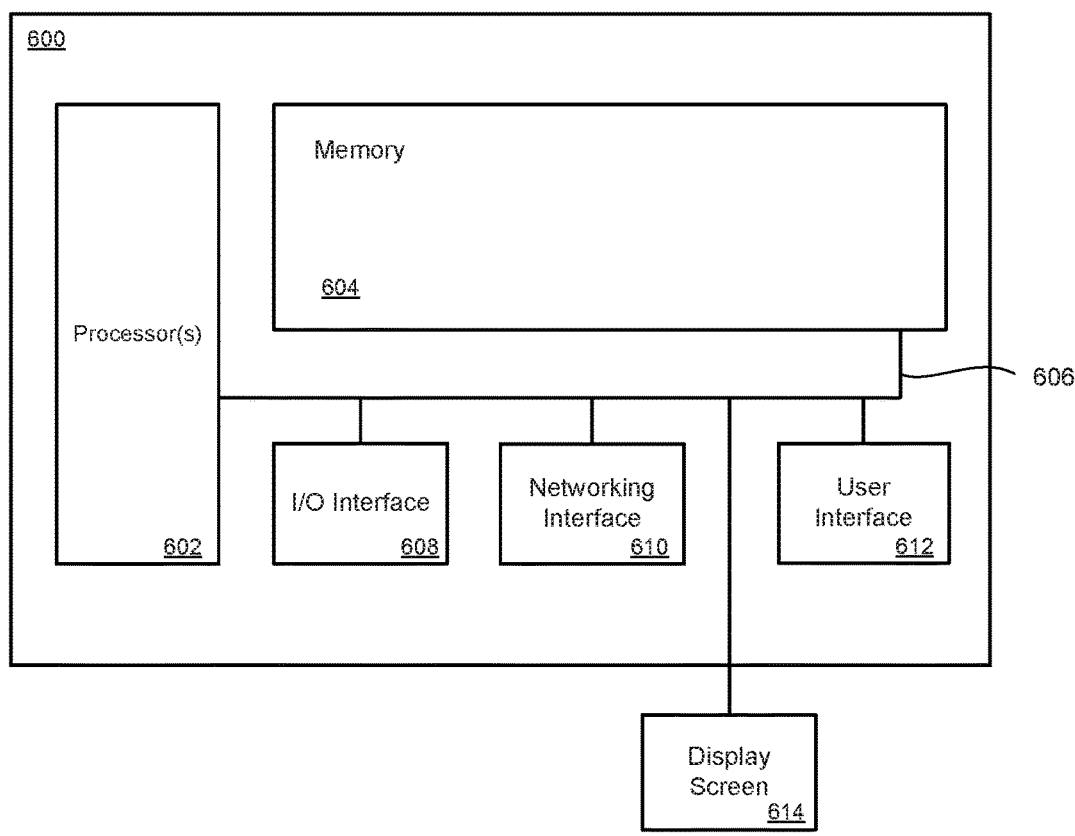
FIG. 6 illustrates a computing system that includes a data storage device in accordance with an example embodiment.

FIG. 6 illustrates a general computing system or device 600 that can be employed in the present technology. The computing system 600 can include a processor 602 in communication with a memory 604. The memory 604 can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof.

The computing system or device 600 additionally includes a local communication interface 606 for connectivity between the various components of the system. For example, the local communication interface 606 can be a local data bus and/or any related address or control busses as may be desired.

The computing system or device 600 can also include an I/O (input/output) interface 608 for controlling the I/O functions of the system, as well as for I/O connectivity to devices outside of the computing system 600. A network interface 610 can also be included for network connectivity. The network interface 610 can control network communications both within the system and outside of the system. The network interface can include a wired interface, a wireless interface, a Bluetooth interface, optical interface, and the like, including appropriate combinations thereof. Furthermore, the computing system 600 can additionally include a user interface 612, a display device 614, as well as various other components that would be beneficial for such a system.

The processor 602 can be a single or multiple processors, and the memory 604 can be a single or multiple memories. The local communication interface 606 can be used as a pathway to facilitate communication between any of a single processor, multiple processors, a single memory, multiple memories, the various interfaces, and the like, in any useful combination.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific invention embodiments and point out specific features, elements, or steps that can be used or otherwise combined in achieving such embodiments.

In one example, there is provided a NAND memory. The NAND memory can include a variable-type memory block. The NAND memory can include a first-type dedicated memory block. The NAND memory can include a second-type dedicated memory block. The NAND memory can include logic configured to perform a data operation on the first-type dedicated memory block using a first first-type access mode. The NAND memory can include logic configured to perform a data operation on the variable-type memory block using a second first-type access mode.

In one example of the NAND memory, the first first-type access mode is a first single-level cell (SLC) on-the-fly (OTF) user access mode and the second first-type access mode is a second SLC OTF user access mode.

In one example of the NAND memory, the first first-type access mode is associated with a first trim set and the second first-type access mode is associated with a second trim set that is different than the first trim set.

In one example of the NAND memory, the second first-type access mode preserves a cycling endurance and a raw bit error rate (RBER) for the variable-type memory block.

In one example of the NAND memory, the second first-type access mode is selectable via a memory command.

In one example of the NAND memory, the second first-type access mode is selectable via a set feature command.

In one example of the NAND memory, the logic is further configured to perform a data operation on the second-type dedicated memory block using a second-type access mode, wherein the second-type access mode is a triple-level cell (TLC) or quad-level cell (QLC) user access mode.

In one example of the NAND memory, the logic is further configured to perform a data operation on the variable-type memory block using a second-type access mode, wherein the second-type access mode is a triple-level cell (TLC) or quad-level cell (QLC) user access mode.

In one example of the NAND memory, the variable-type memory block is a single-level cell (SLC) memory block or a triple/quad-level cell (TLC/QLC) memory block on a per cycle basis.

In one example of the NAND memory, the first-type dedicated memory block is a single-level cell (SLC) dedicated memory block.

In one example of the NAND memory, the second-type dedicated memory block is a triple-level cell (TLC) dedicated memory block or a quad-level cell (QLC) dedicated memory block.

In one example of the NAND memory, the logic is further configured to: initialize defined variable-type memory blocks in the NAND memory to be accessible via the second first-type access mode; and initialize defined first-type dedicated memory blocks in the NAND memory to be accessible via the first first-type access mode.

In one example of the NAND memory, the data operation is one of: a read operation, a write operation or an erase operation.

In one example, there is provided a computing system. The computing system can include a motherboard. The computing system can include a NAND memory coupled to the motherboard.

In one example of the computing system, the computing system comprises a desktop computer, a laptop, a tablet, a smartphone, a wearable device, a server, or a combination thereof.

In one example, there is provided a storage device. The storage device can include a NAND memory. The NAND memory can include a variable-type memory block. The NAND memory can include a first-type dedicated memory block. The NAND memory can include a second-type dedicated memory block. The storage device can include a memory controller. The memory controller can include logic to send a command to the NAND memory to perform a data operation on the first-type dedicated memory block using a first first-type access mode. The memory controller can include logic to send a command to the NAND memory to perform a data operation on the variable-type memory block using a second first-type access mode.

In one example of the storage device, the first first-type access mode is a first single-level cell (SLC) on-the-fly (OTF) user access mode and the second first-type access mode is a second SLC OTF user access mode.

In one example of the storage device, the first first-type access mode is associated with a first trim set and the second first-type access mode is associated with a second trim set that is different than the first trim set.

In one example of the storage device, the second first-type access mode preserves a cycling endurance and a raw bit error rate (RBER) for the variable-type memory block.

In one example of the storage device, the second first-type access mode is selectable via a memory command.

In one example of the storage device, the second first-type access mode is selectable via a set feature command.

In one example of the storage device, the memory controller further comprises logic to send a command to the NAND memory to perform a data operation on the second-type dedicated memory block using a second-type access mode, wherein the second-type access mode is a triple-level cell (TLC) or quad-level cell (QLC) user access mode.

In one example of the storage device, the memory controller further comprises logic to send a command to the NAND memory to perform a data operation on the variable-type memory block using a second-type access mode, wherein the second-type access mode is a triple-level cell (TLC) or quad-level cell (QLC) user access mode.

In one example of the storage device, the variable-type memory block is a single-level cell (SLC) memory block or a triple/quad-level cell (TLC/QLC) memory block on a per cycle basis.

In one example of the storage device, the first-type dedicated memory block is a single-level cell (SLC) dedicated memory block.

In one example of the storage device, the second-type dedicated memory block is a triple-level cell (TLC) dedicated memory block or a quad-level cell (QLC) dedicated memory block.

In one example of the storage device, the data operation is one of: a read operation, a write operation or an erase operation.

In one example, there is provided a method for performing data operations on a NAND memory. The method can include the operation of: performing a data operation on a first-type dedicated memory block in the NAND memory using a first first-type access mode. The method can include the operation of: performing a data operation on a variable-type memory block in the NAND memory using a second first-type access mode.

In one example of the method for performing data operations on a NAND memory, the method further comprises the operation of: performing a data operation on a second-type dedicated memory block in the NAND memory using a second-type access mode, wherein the second-type access mode is a triple-level cell (TLC) or quad-level cell (QLC) user access mode.

In one example of the method for performing data operations on a NAND memory, the method further comprises the operation of: performing a data operation on the variable-type memory block in the NAND memory using a second-type access mode, wherein the second-type access mode is a triple-level cell (TLC) or quad-level cell (QLC) user access mode.

In one example of the method for performing data operations on a NAND memory, the method further comprises the operations of: initializing defined variable-type memory blocks in the NAND memory to be accessible via the second first-type access mode; and initializing defined first-type dedicated memory blocks in the NAND memory to be accessible via the first first-type access mode.

In one example of the method for performing data operations on a NAND memory, the first first-type access mode is a first single-level cell (SLC) on-the-fly (OTF) user access mode and the second first-type access mode is a second SLC OTF user access mode.

In one example of the method for performing data operations on a NAND memory, the second first-type access mode is selectable via a memory command; or the second first-type access mode is selectable via a set feature command.

In one example of the method for performing data operations on a NAND memory, the variable-type memory block is a single-level cell (SLC) memory block or a triple/quad-level cell (TLC/QLC) memory block on a per cycle basis; first-type dedicated memory block is a SLC dedicated memory block; and the second-type dedicated memory block is a TLC dedicated memory block or a QLC dedicated memory block.

In one example, there is at least one non-transitory machine readable storage medium having instructions embodied thereon for performing data operations, the instructions when executed by one or more processors at a storage device perform the following: performing, at the storage device, a data operation on a first-type dedicated memory block in a NAND memory of the storage device using a first first-type access mode; and performing, at the storage device, a data operation on a variable-type memory block in the NAND memory using a second first-type access mode.

In one example of the at least one non-transitory machine readable storage medium, the machine readable storage medium further comprises instructions when executed perform the following: performing a data operation on a second-type dedicated memory block in the NAND memory using a second-type access mode, wherein the second-type access mode is a triple-level cell (TLC) or quad-level cell (QLC) user access mode.

In one example of the at least one non-transitory machine readable storage medium, the machine readable storage medium further comprises instructions when executed perform the following: performing a data operation on the variable-type memory block in the NAND memory using a second-type access mode, wherein the second-type access mode is a triple-level cell (TLC) or quad-level cell (QLC) user access mode.

In one example of the at least one non-transitory machine readable storage medium, the machine readable storage medium further comprises instructions when executed perform the following: initializing defined variable-type memory blocks in the NAND memory to be accessible via the second first-type access mode; and initializing defined first-type dedicated memory blocks in the NAND memory to be accessible via the first first-type access mode.

In one example of the at least one non-transitory machine readable storage medium, the first first-type access mode is a first single-level cell (SLC) on-the-fly (OTF) user access mode and the second first-type access mode is a second SLC OTF user access mode.

In one example of the at least one non-transitory machine readable storage medium, the second first-type access mode is selectable via a memory command; or the second first-type access mode is selectable via a set feature command.

In one example of the at least one non-transitory machine readable storage medium, the variable-type memory block is a single-level cell (SLC) memory block or a triple/quad-level cell (TLC/QLC) memory block on a per cycle basis; first-type dedicated memory block is a SLC dedicated memory block; and the second-type dedicated memory block is a TLC dedicated memory block or a QLC dedicated memory block.

While the forgoing examples are illustrative of the principles of invention embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. A NAND memory, comprising:
   a variable-type memory block;
   a first-type dedicated memory block;
   a second-type dedicated memory block; and
   logic configured to:
     perform a data operation on the first-type dedicated memory block using a first first-type access mode; and
     perform a data operation on the variable-type memory block using a second first-type access mode.

2. The NAND memory of claim 1, wherein the first first-type access mode is a first single-level cell (SLC) on-the-fly (OTF) user access mode and the second first-type access mode is a second SLC OTF user access mode.

3. The NAND memory of claim 1, wherein the first first-type access mode is associated with a first trim set and the second first-type access mode is associated with a second trim set that is different than the first trim set.

4. The NAND memory of claim 1, wherein the second first-type access mode preserves a cycling endurance and a raw bit error rate (RBER) for the variable-type memory block.

5. The NAND memory of claim 1, wherein the second first-type access mode is selectable via a memory command.

6. The NAND memory of claim 1, wherein the second first-type access mode is selectable via a set feature command.

7. The NAND memory of claim 1, wherein the logic is further configured to perform a data operation on the second-type dedicated memory block using a second-type access mode, wherein the second-type access mode is a triple-level cell (TLC) or quad-level cell (QLC) user access mode.

8. The NAND memory of claim 1, wherein the logic is further configured to perform a data operation on the variable-type memory block using a second-type access mode, wherein the second-type access mode is a triple-level cell (TLC) or quad-level cell (QLC) user access mode.

9. The NAND memory of claim 1, wherein the variable-type memory block is a single-level cell (SLC) memory block or a triple/quad-level cell (TLC/QLC) memory block on a per cycle basis.

10. The NAND memory of claim 1, wherein the first-type dedicated memory block is a single-level cell (SLC) dedicated memory block.

11. The NAND memory of claim 1, wherein the second-type dedicated memory block is a triple-level cell (TLC) dedicated memory block or a quad-level cell (QLC) dedicated memory block.

12. The NAND memory of claim 1, wherein the logic is further configured to:
   initialize defined variable-type memory blocks in the NAND memory to be accessible via the second first-type access mode; and
   initialize defined first-type dedicated memory blocks in the NAND memory to be accessible via the first first-type access mode.

13. The NAND memory of claim 1, wherein the data operation is one of: a read operation, a write operation or an erase operation.

14. A method for performing data operations on a NAND memory, the method comprising:
   performing a data operation on a first-type dedicated memory block in the NAND memory using a first first-type access mode; and
   performing a data operation on a variable-type memory block in the NAND memory using a second first-type access mode.

15. The method of claim 14, further comprising performing a data operation on a second-type dedicated memory block in the NAND memory using a second-type access mode, wherein the second-type access mode is a triple-level cell (TLC) or quad-level cell (QLC) user access mode.

16. The method of claim 14, further comprising performing a data operation on the variable-type memory block in the NAND memory using a second-type access mode, wherein the second-type access mode is a triple-level cell (TLC) or quad-level cell (QLC) user access mode.

17. The method of claim 14, further comprising:
   initializing defined variable-type memory blocks in the NAND memory to be accessible via the second first-type access mode; and
   initializing defined first-type dedicated memory blocks in the NAND memory to be accessible via the first first-type access mode.

18. The method of claim 14, wherein the first first-type access mode is a first single-level cell (SLC) on-the-fly (OTF) user access mode and the second first-type access mode is a second SLC OTF user access mode.

19. The method of claim 14, wherein:
   the second first-type access mode is selectable via a memory command; or
   the second first-type access mode is selectable via a set feature command.

20. The method of claim 14, wherein:
   the variable-type memory block is a single-level cell (SLC) memory block or a triple/quad-level cell (TLC/QLC) memory block on a per cycle basis;
   first-type dedicated memory block is a SLC dedicated memory block; and
   the second-type dedicated memory block is a TLC dedicated memory block or a QLC dedicated memory block.

* * * * *